US008737265B2

(12) United States Patent
Lee et al.

(10) Patent No.: US 8,737,265 B2
(45) Date of Patent: May 27, 2014

(54) METHODS AND APPARATUSES FOR MACHINE TYPE COMMUNICATION

(75) Inventors: Anthony Lee, San Diego, CA (US); Guotong Wang, Beijing (CN)

(73) Assignee: Via Telecom Co., Ltd., George Town, Grand Cayman (KY)

( * ) Notice: Subject to any disclaimer, the term of this patent is extended or adjusted under 35 U.S.C. 154(b) by 308 days.

(21) Appl. No.: 13/163,104

(22) Filed: Jun. 17, 2011

(65) Prior Publication Data

US 2011/0310769 A1 Dec. 22, 2011

Related U.S. Application Data

(60) Provisional application No. 61/356,181, filed on Jun. 18, 2010.

(51) Int. Cl.
*H04W 72/10* (2009.01)
(52) U.S. Cl.
USPC .......................................... 370/254; 370/336
(58) Field of Classification Search
USPC ......... 370/230, 328, 206, 315, 352, 216, 310, 370/338, 329, 252, 235, 330, 336, 466; 455/466, 509, 500, 456.1, 458, 517, 455/404.1, 435.1; 375/259; 709/225
See application file for complete search history.

(56) References Cited

U.S. PATENT DOCUMENTS

| 7,649,907 | B2 * | 1/2010 | Jung et al. ...................... 370/466 |
| 7,746,767 | B2 * | 6/2010 | Allasia et al. .................. 370/216 |
| 2006/0193256 | A1 * | 8/2006 | Burns et al. .................... 370/230 |
| 2006/0268760 | A1 * | 11/2006 | Fang et al. ...................... 370/328 |
| 2008/0025196 | A1 * | 1/2008 | Karaoguz et al. .............. 370/206 |
| 2009/0219851 | A1 * | 9/2009 | Abraham et al. .............. 370/315 |
| 2010/0080211 | A1 * | 4/2010 | Bossler et al. ................. 370/352 |
| 2011/0086642 | A1 * | 4/2011 | Lee et al. ....................... 455/445 |
| 2011/0128911 | A1 * | 6/2011 | Shaheen ........................ 370/328 |
| 2011/0134841 | A1 * | 6/2011 | Shaheen ........................ 370/328 |
| 2011/0194510 | A1 * | 8/2011 | Gaal et al. ...................... 370/329 |
| 2011/0201365 | A1 * | 8/2011 | Segura .......................... 455/466 |
| 2011/0228750 | A1 * | 9/2011 | Tomici et al. .................. 370/338 |
| 2011/0235558 | A1 * | 9/2011 | Diachina et al. .............. 370/310 |
| 2011/0256896 | A1 * | 10/2011 | Giaretta et al. ............... 455/509 |

(Continued)

FOREIGN PATENT DOCUMENTS

CN 101707631 5/2010

OTHER PUBLICATIONS

English language translation of abstract of CN 101707631 (published May 12, 2010).

*Primary Examiner* — Asad Nawaz
*Assistant Examiner* — Parth Patel
(74) *Attorney, Agent, or Firm* — McClure, Qualey & Rodack, LLP

(57) ABSTRACT

A Machine Type Communication (MTC) method for an MTC device to configure a plurality of MTC logical channels associated with an MTC application is provided. The method comprises the steps of: configuring, in a Medium Access Control (MAC) layer, the MTC logical channels independently from a Common Control Channel (CCCH), a Dedicated Control Channel (DCCH), and a Dedicated Traffic Channel (DTCH), wherein the MTC logical channels include a Machine Type Communication Traffic Channel (MTCTCH) and a Machine Type Communication Control Channel (MTCCCH); carrying uplink and downlink traffic data dedicated for the MTC application executed by the MTC device in the MTCTCH; and carrying uplink and downlink control data dedicated for the MTC application executed by the MTC device in the MTCCCH.

18 Claims, 9 Drawing Sheets

(56) References Cited

U.S. PATENT DOCUMENTS

| | | | |
|---|---|---|---|
| 2011/0261891 A1* | 10/2011 | Vos et al. | 375/259 |
| 2011/0270984 A1* | 11/2011 | Park | 709/225 |
| 2011/0274040 A1* | 11/2011 | Pani et al. | 370/328 |
| 2011/0274042 A1* | 11/2011 | Diachina et al. | 370/328 |
| 2011/0299492 A1* | 12/2011 | Lee et al. | 370/329 |
| 2011/0310731 A1* | 12/2011 | Park et al. | 370/230 |
| 2012/0004003 A1* | 1/2012 | Shaheen et al. | 455/509 |
| 2012/0040700 A1* | 2/2012 | Gomes et al. | 455/500 |
| 2012/0275305 A1* | 11/2012 | Lin | 370/235 |
| 2012/0300655 A1* | 11/2012 | Lee et al. | 370/252 |
| 2012/0309419 A1* | 12/2012 | Lee et al. | 455/456.1 |
| 2012/0327896 A1* | 12/2012 | Lee et al. | 370/330 |
| 2012/0329485 A1* | 12/2012 | Lee et al. | 455/458 |
| 2013/0003694 A1* | 1/2013 | Choi et al. | 370/330 |
| 2013/0010768 A1* | 1/2013 | Lee et al. | 370/336 |
| 2013/0012244 A1* | 1/2013 | Lee et al. | 455/458 |
| 2013/0029713 A1* | 1/2013 | Jang et al. | 455/517 |
| 2013/0034059 A1* | 2/2013 | Lee et al. | 370/328 |
| 2013/0034071 A1* | 2/2013 | Lee et al. | 370/329 |
| 2013/0039324 A1* | 2/2013 | Kwon et al. | 370/329 |
| 2013/0040597 A1* | 2/2013 | Jang et al. | 455/404.1 |
| 2013/0058301 A1* | 3/2013 | Lee et al. | 370/329 |
| 2013/0100895 A1* | 4/2013 | Aghili et al. | 370/329 |
| 2013/0130684 A1* | 5/2013 | Gomes et al. | 455/435.1 |

* cited by examiner

METHODS AND APPARATUSES FOR MACHINE TYPE COMMUNICATION

CROSS REFERENCE TO RELATED APPLICATIONS

This application claims the benefit of U.S. Provisional Application No. 61/356,181 filed on Jun. 18, 2010, the entirety of which is incorporated by reference herein.

BACKGROUND OF THE INVENTION

1. Field of the Invention

The invention generally relates to Machine Type Communication (MTC), and more particularly, to methods and apparatuses for configuration of logical channels for an MTC application in a Medium Access Control (MAC) layer.

2. Description of the Related Art

With the development of wireless applications, the wireless network technology has evolved to provide data transfer capabilities which are not only for Human to Human (H2H) communication applications, but also for Machine to Machine (M2M) communication applications. The M2M communication application is a field that is growing rapidly, providing a large number of potential business opportunities.

The M2M communication or the MTC bears enormous application diversity. Examples of fields in which the M2M communication or the MTC is used includes smart meter, alarm system, road tolling system, and asset tracking system fields and so on. The M2M communication or the MTC allows wireless communication applications not only for mobile phones, but also laptop computers. With a suitable M2M server, the M2M communication or the MTC allows any device that is integrated with an MTC module to connect to a network and perform the execution of an MTC application. Compared to H2H or the human to machine (H2M) communication, the M2M communication or the MTC is a type of data exchange which requires no human interaction.

The characteristics of the MTC include a large quantity of MTC devices, small data sizes (e.g. 3 to 5 bytes), and delay tolerability. When MAC layer spec for the Long Term Evolution (LTE) technology are present, the data generated by the MTC applications and the data generated by normal user equipment (UE) applications are transmitted using the same logical channels, wherein the MTC applications require no human interactions and the normal UE applications require human interactions. The logical channels include the Dedicated Traffic Channel (DTCH), the Common Control Channel (CCCH), and the Dedicated Control Channel (DCCH). For example, metered data for a smart meter and voice or data traffic for a mobile phone are transmitted on the same logical channels. Moreover, within the existing Quality of Service (QoS) architecture, the M2M communication or MTC application may share the same QoS level with other normal UE applications. Therefore, it is difficult to distinguish the M2M communication or MTC devices from the normal UEs through the QoS level of the data flow. Thus, it is difficult for a MAC scheduler to determine a priority among the M2M communication or MTC devices and normal UEs; although the M2M communication or the MTC devices usually have a lower priority. In the case when the quantity of MTC devices gets too large which lead the MTC data increase dramatically, the scheduling for the data of the normal UEs are definitely affected by the large amount of MTC data.

BRIEF SUMMARY OF THE INVENTION

Accordingly, embodiments of the invention provide Machine Type Communication (MTC) apparatuses and methods to configure the MTC logical channels. In one aspect of the invention, a Machine Type Communication (MTC) method for an MTC device to configure a plurality of MTC logical channels associated with an MTC application is provided The method comprises the steps of: configuring, in a Medium Access Control (MAC) layer, the MTC logical channels independently from a Common Control Channel (CCCH), a Dedicated Control Channel (DCCH), and a Dedicated Traffic Channel (DTCH), wherein the MTC logical channels include a Machine Type Communication Traffic Channel (MTCTCH) and a Machine Type Communication Control Channel (MTCCCH); carrying uplink and downlink traffic data dedicated for the MTC application executed by the MTC device in the MTCTCH; and carrying uplink and downlink control data dedicated for the MTC application executed by the MTC device in the MTCCCH In another aspect of the invention, a Machine Type Communication (MTC) apparatus for configuring a plurality of MTC logical channels associated with an MTC application is provided. The apparatus comprises a processor, the processor configures the MTC logical channels independently from a Common Control Channel (CCCH), a Dedicated Control Channel (DCCH), and a Dedicated Traffic Channel (DTCH) in a Medium Access Control (MAC) layer, wherein the MTC logical channels include a Machine Type Communication Traffic Channel (MTCTCH) and a Machine Type Communication Control Channel (MTCCCH), and uplink and downlink traffic data dedicated for the MTC application is carried in the MTCCCH, and uplink and downlink control data dedicated for the MTC application is carried in the MTCCCH.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Reference will now be made in detail to the present embodiments of the disclosure, wherein examples are illustrated in the accompanying drawings. Wherever possible, the same reference numbers will be used throughout the drawings to refer to the same or like parts. As used herein, the terms "M2M communication", "MTC" and similar terms may be used interchangeably to refer to the machine type communication in accordance with exemplary embodiments. Thus, use of any such terms should not be taken to limit the spirit and scope of embodiments of the present disclosure.

Figure 1:
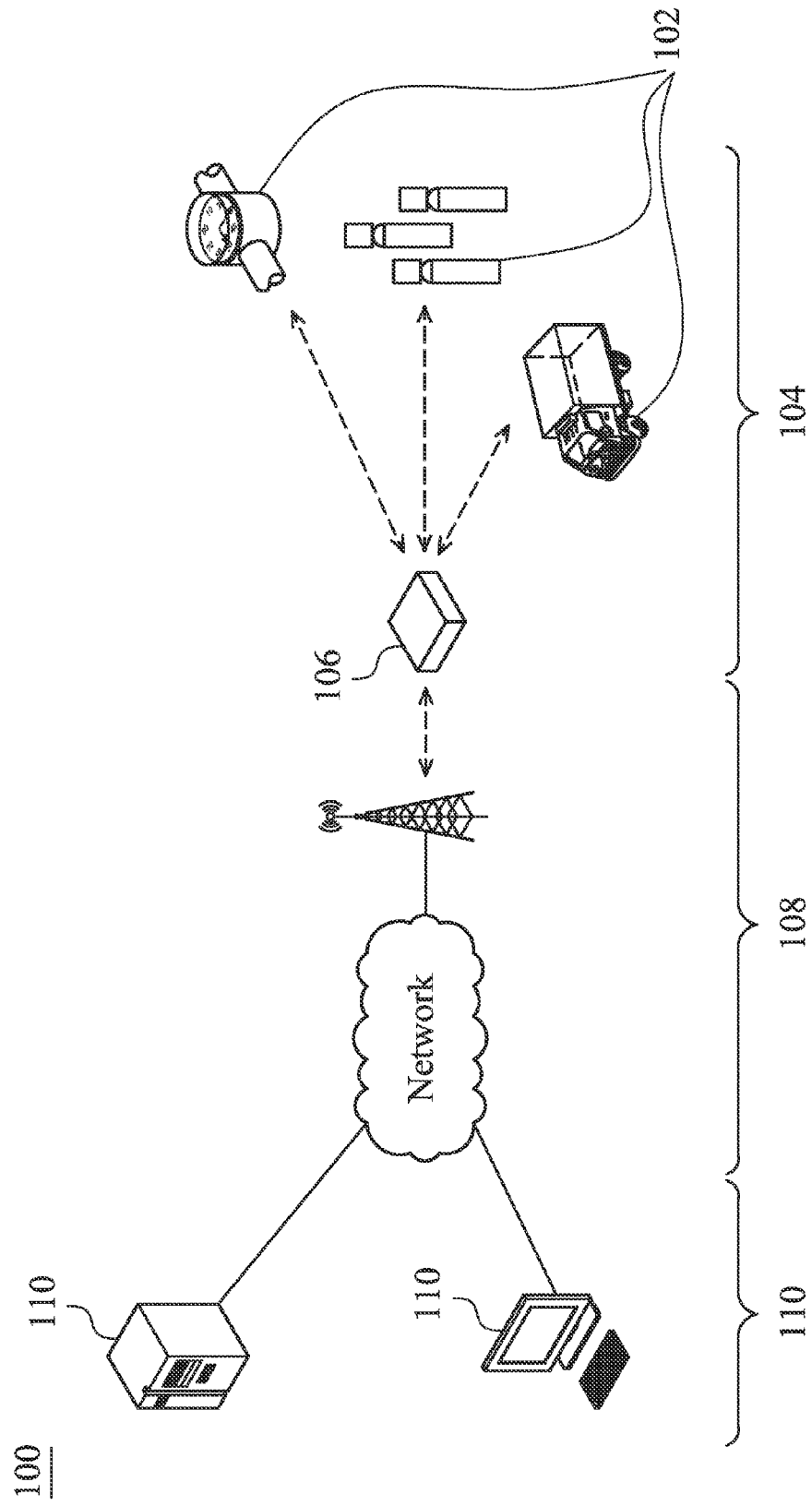
FIG. 1 illustrates a simplified structure of an exemplary MTC system 100.

FIG. 1 illustrates a simplified structure of an exemplary MTC system 100. The MTC system 100 includes an M2M area network 104, which includes several MTC devices 102, an M2M gateway 106, a communication network 108, and the M2M application servers 110. Specifically, the MTC devices 102 include any devices that may perform a data exchange with other devices without human interactions by communicating via a wired or a wireless communication network. Examples of the MTC devices 102 include sensors, meters, switches, or any other devices that are integrated with an MTC module in order to connect to the communication network 108 and perform the execution of an MTC application. For example, a smart meter may be configured to read a meter (e.g. a utilities meter) and send electric meter read data to the M2M application server 110 of a utilities company via the communication network 108. Since the process of acquiring the electric meter read data requires no human interaction, acquiring the electric meter read may be an example of the MTC application. Further, the M2M area network 104 provides interconnections between the MTC devices 102 and the M2M gateway 106, wherein the M2M area network 104 may be a personal area network. The M2M gateway 106 provides a gateway that interconnects between the MTC devices 102 and the communication network 108, wherein the communication network 108 may be a wire-line or a wireless network. The MTC devices 102 may connect to the communication network 108 through the M2M gateway 106 or without going through the M2M gateway 106 for performing data exchange with the M2M application servers 110. The communication network 108 may include a Long Term Evolution (LTE) network, a Digital Subscriber Line (xDSL) network, a Worldwide Interoperability for Microwave Access (WiMAX) network, a Wireless Local Area Network (WLAN), or any other communication networks implemented with other communication technologies. When the communication network 108 is an LTE network, the communication network 108 may comprise several Node B, providing access to any wireless device that is complied with the LTE technology to connect to the communication network 108.

The MTC devices 102 may connect to the communication network 108 through the M2M gateway 106 or without going through the M2M gateway 106 for performing data exchange with the M2M application servers 110. Specifically, the M2M application servers 110 include servers provided by companies to provide a middleware layer for different MTC applications, such as a home monitoring application, a parking guidance application, an electric meter reading application and so on. For example, a M2M application server 110 may be configured to receive the data from an MTC device 102 via the communication network 108 and translate the received data to meaningful information (such as home monitoring information, parking guidance information, and electric meter read information, or others). In this regard, the M2M application server 110 may be a home monitoring server, a parking guidance server, an electric meter reading server, or others.

Figure 2:
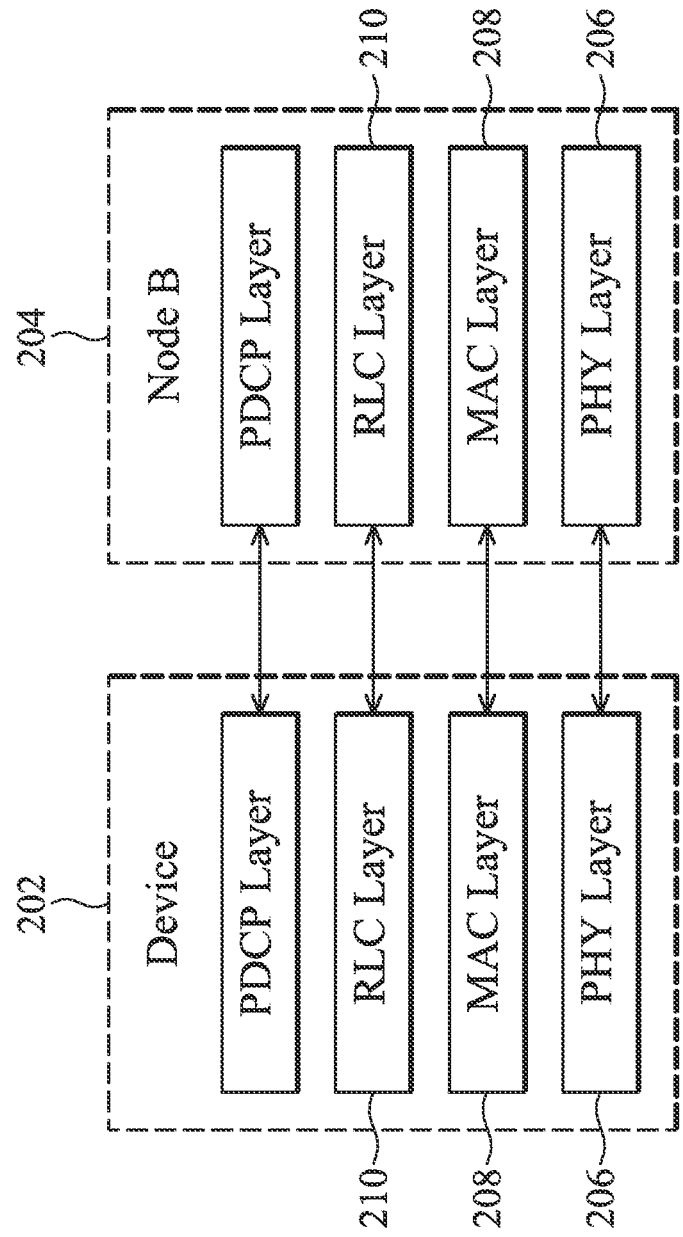
FIG. 2 illustrates a user plane protocol stack for an exemplary LTE system.
Figure 3:
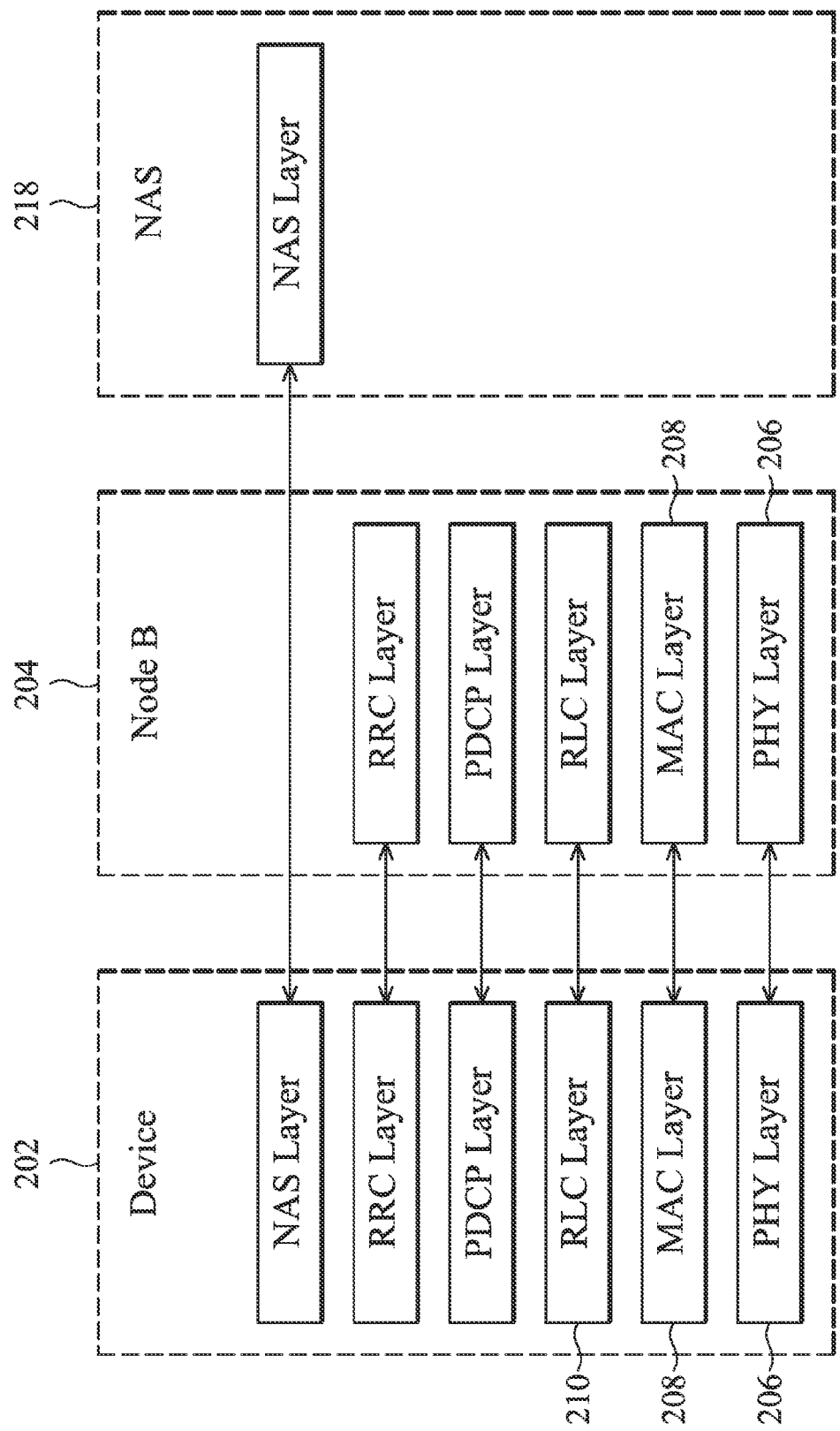
FIG. 3 illustrates a control plane protocol stack for an exemplary LTE system.

Please refer to FIG. 2 and FIG. 3. FIG. 2 illustrates a user plane protocol stack for an exemplary LTE system, and FIG. 3 illustrates a control plane protocol stack for an exemplary LTE system. The control plane may perform a function of exchanging the control data between the device 202 and the Node B 204, while the user plane may perform a function of exchanging traffic data between the device 202 and the Node B 204. In an embodiment, the device 202 may comprise normal UEs (such as mobile phones or laptop computers) and the MTC devices 102 illustrated in FIG. 1. Both the control plane and the user plane include a Radio Link Control (RLC) layer 210, a Medium Access Control (MAC) layer 208 and a physical (PHY) layer 206. In the protocol stacks, the communication between layers is performed by data exchange through channels. For example, the RLC layer 210 may perform data exchange with the MAC layer 208 through the logical channels. The MAC layer 208 may perform data exchange with the PHY layer 206 through the transport channels. And the PHY layer 206 may perform data exchange through the PHY layer 206 at the other end (e.g. the device 202 or the Node B 204) through the physical channels.

Moreover, the functions performed by the MAC layer 208 include priority handling of different logical channels in the device 202, mapping the logical channels to the transport channels, and performing error correction by using the Hybrid Automatic Repeat request (HARQ) technique. In a wireless network, when a radio resource control (RRC) connection is established between the RLC layer 210 of the device 202 and the RLC layer of the Node B 204, the device 202 is in an RRC connected mode. Meanwhile, when there is no RRC connection established between the RLC layer 210 of the device 202 and the RLC layer of the Node B 204, the device 202 is in an RRC idle mode.

Figure 4:
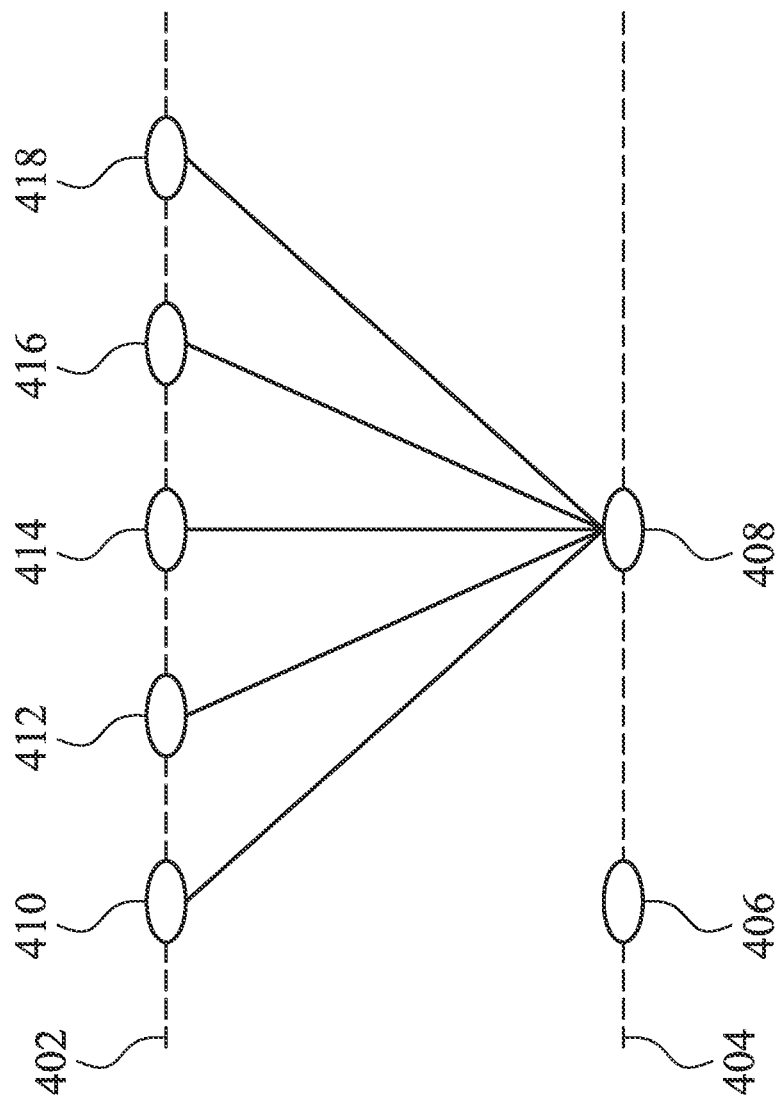
FIG. 4 illustrates a mapping relationship between the uplink logical channel 402 and the uplink transport channel 404 in the MAC layer 208 according to an embodiment of the invention.

FIG. 4 illustrates a mapping relationship between the uplink logical channel 402 and the uplink transport channel 404 in the MAC layer 208 according to an embodiment of the invention. In the embodiment, the uplink transport channel 404 includes a Random Access Channel (RACH) 406 and an Uplink Shared Channel (UL-SCH) 408. The uplink logical channel 402 includes a Common Control Channel (CCCH) 410, a Dedicated Control Channel (DCCH) 412, a Dedicated Traffic Channel (DTCH) 414, a Machine Type Communication Traffic Channel (MTCTCH) 416 and a Machine Type Communication Control Channel (MTCCCH) 418.

Figure 5:
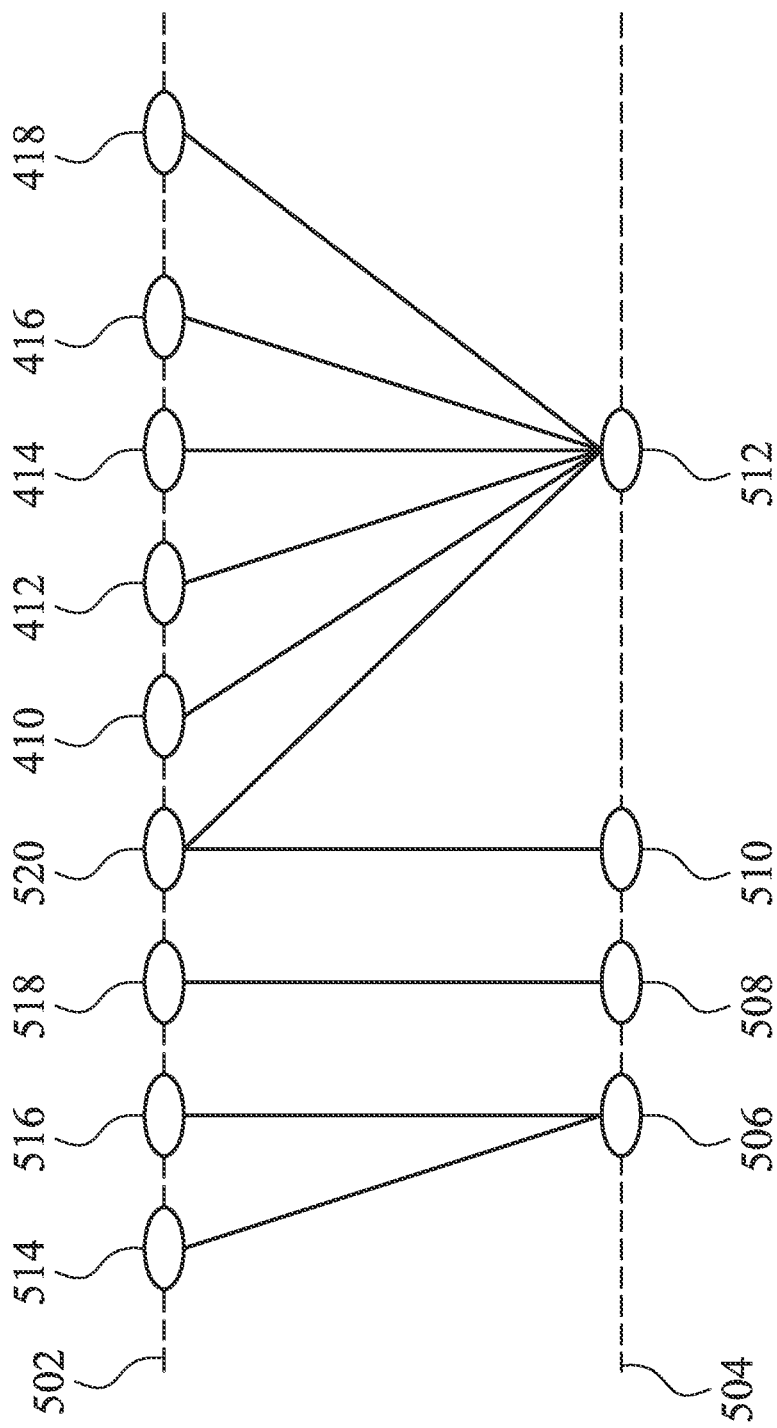
FIG. 5 illustrates a mapping relationship between the downlink logical channel 502 and the uplink transport channel 504 in the MAC layer 208 according to an embodiment of the invention.

FIG. 5 illustrates a mapping relationship between the downlink logical channel 502 and the uplink transport channel 504 in the MAC layer 208 according to an embodiment of the invention. In the embodiment, the downlink transport channel 504 includes a Multicast Channel (MCH) 506, a Paging Channel (PCH) 508, a Broadcast Channel (BCH) 510, and a Downlink Shared Channel (DL-SCH) 512. The downlink logical channel 502 includes a Multicast Transport Channel (MTCH) 514, a Multicast Control Channel (MCCH) 516, a Paging Control Channel (PCCH) 518, a Broadcast Control Channel (BCCH) 520, a Common Control Channel (CCCH) 410, a Dedicated Control Channel (DCCH) 412, a Dedicated Traffic Channel (DTCH) 414, a Machine Type Communication Traffic Channel (MTCTCH) 416 and a Machine Type Communication Control Channel (MTCCCH) 418.

In the existing specification of the MAC layer 208, the uplink and downlink traffic data generated by the MTC applications (which requires no human interaction) and the normal UE applications (which requires human interactions) is transmitted or exchanged by using the DTCH 414, wherein the DTCH 414 is a point to point channel dedicated for transmission of the traffic data for a device (e.g. the device 202). Therefore, the uplink and downlink control data generated by the MTC applications (which requires no human interaction) and the normal UE applications (which requires human interactions) are transmitted or exchanged by using the CCCH 410 and/or the DCCH 412. Specifically, the CCCH 410 is used for transmission of the control data between the device 202 and the network when the RRC connection does not exist, and the DCCH 412 is used for transmission of the control data between the device 202 and the network when the RRC connection is present. The DTCH 414, the CCCH 410, and the DCCH 412 are logical channels. In an uplink direction, the DTCH 414, the CCCH 410, and the DCCH 412 are mapped to the UL-SCH channel 408, and in a downlink direction, the DTCH 414, the CCCH 410, and the DCCH 412 are mapped to the DL-SCH channel 512.

In an embodiment of the invention, the MTC logical channels may be configured independently from the DTCH 414, the CCCH 410, and the DCCH 412 in the MAC layer 208 between the device 202 and the Node B 204. The MTC logical channels comprise the MTCTCH 416 and the MTCCCH 418. In particular, the MTCTCH 416 is configured to carry the uplink and downlink traffic data dedicated for the MTC applications such as the home monitoring application, the parking guidance application, the electric meter read application and so on. The MTCCCH 418 is configured to carry the uplink and downlink control data dedicated for the MTC applications. Additionally, the MTCTCH 416 and the MTCCCH 418 are mapped to the UL-SCH 408 in the uplink direction, and mapped to the DL-SCH 512 in the downlink direction. In one embodiment, the MTCCCH 418 may be configured to carry uplink and downlink control data only when the RRC connection is present. In another embodiment, the MTCCCH 418 may be configured to carry uplink and downlink control data whether the RRC connection is present or not.

Figure 6A:
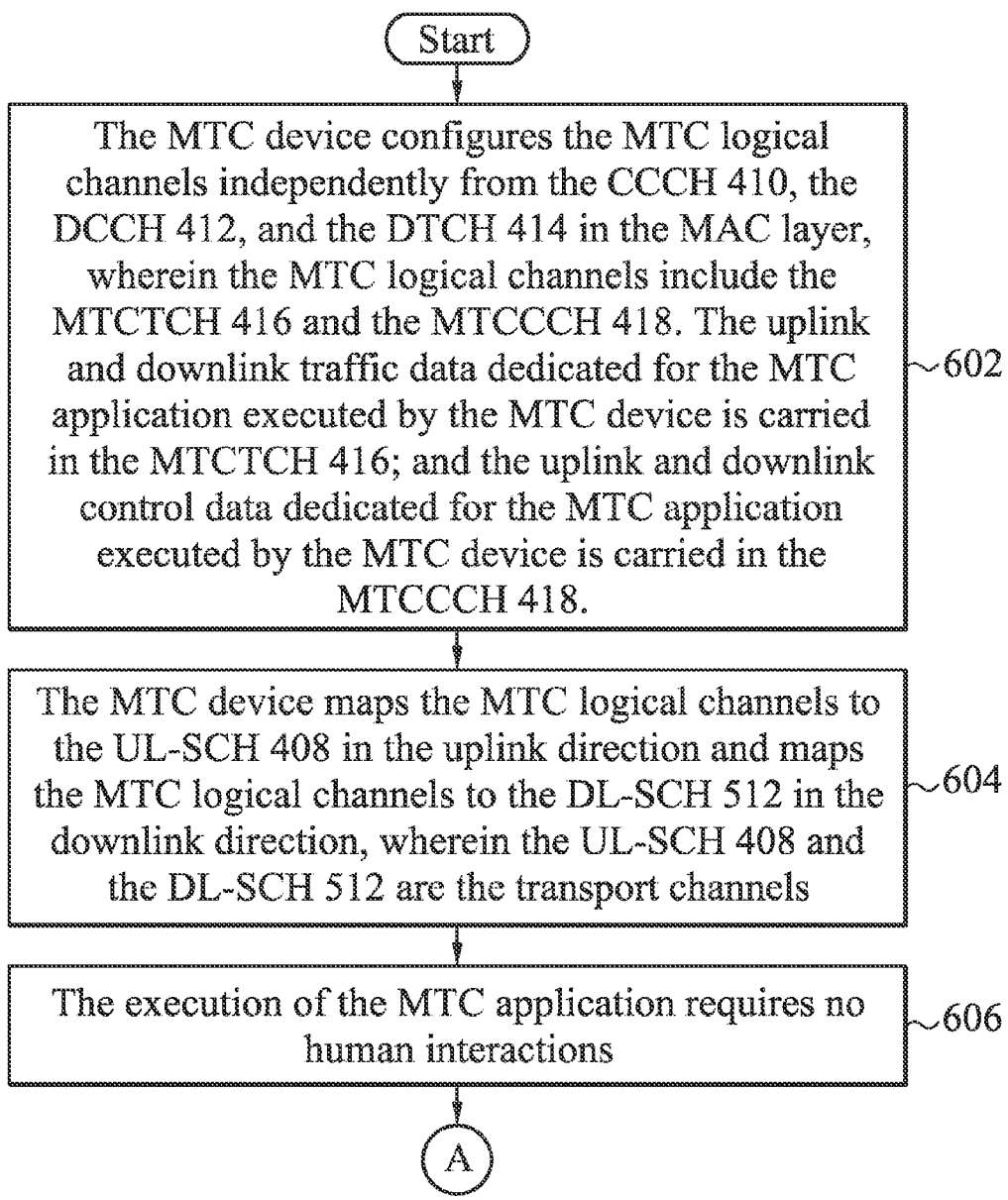
FIG. 6 is a diagram illustrating a flow chart 600 for the MTC logical channel configuration method according to an embodiment of the invention.
Figure 6B:
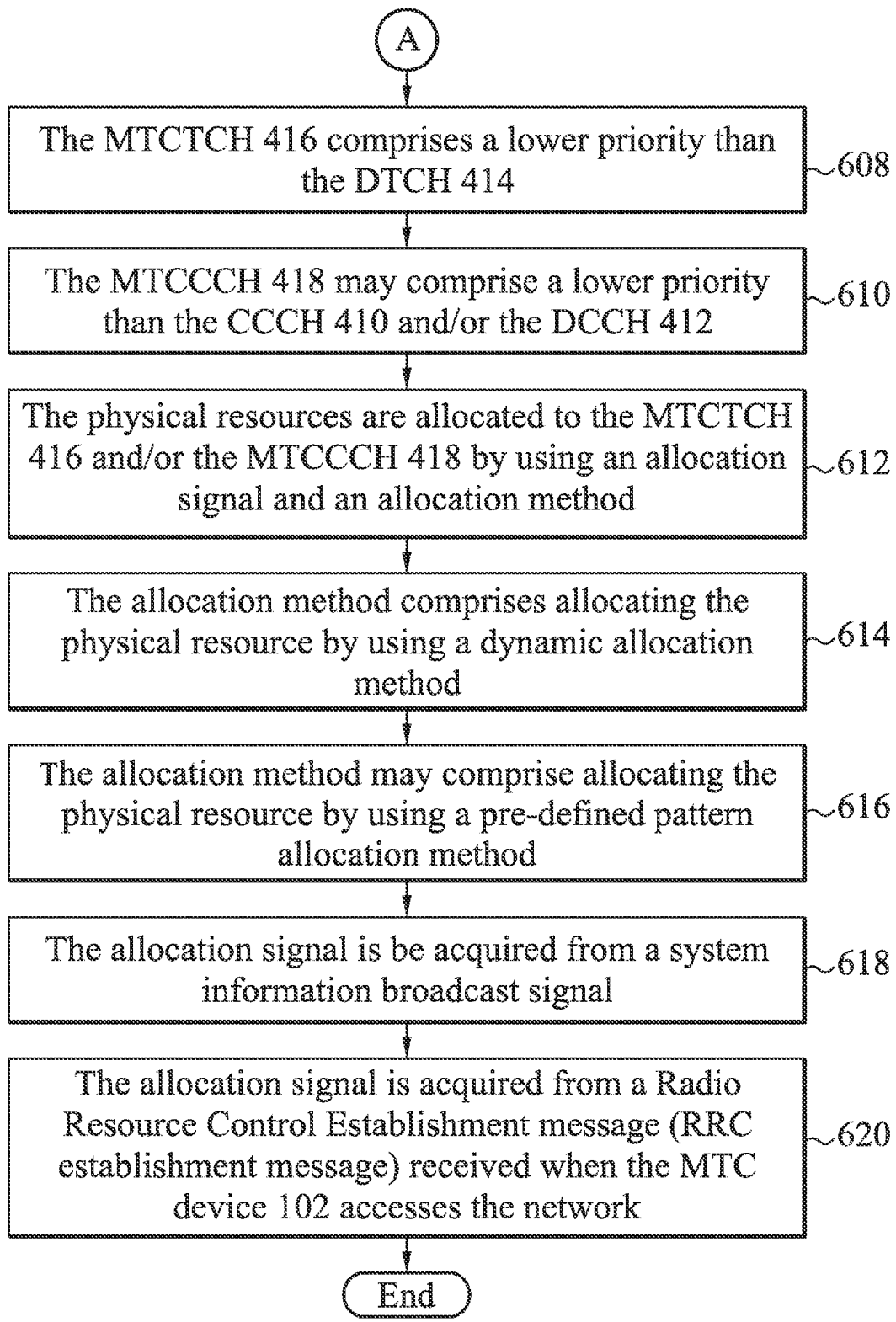

FIG. 6 is a diagram illustrating a flow chart 600 for the MTC logical channel configuration method according to an embodiment of the invention. First, the MTC device configures the MTC logical channels independently from the CCCH 410, the DCCH 412, and the DTCH 414 in the MAC layer, wherein the MTC logical channels include the MTCTCH 416 and the MTCCCH 418. The uplink and downlink traffic data dedicated for the MTC application executed by the MTC device is carried in the MTCTCH 416, and the uplink and downlink control data dedicated for the MTC application executed by the MTC device is carried in the MTCCCH 418 (Step 602). It is to be understood that the uplink and downlink control data generated by the normal UE applications (such as web browsing or short message services) are transmitted or exchanged by using the CCCH 410 and/or the DCCH 412, and the uplink and downlink traffic data generated by the normal UE applications are transmitted or exchanged by using the DTCH 414. In other words, the control data and traffic data generated by the normal UE applications and the MTC applications are transmitted on separate logical channels. Next, the MTC device maps the MTC logical channels to the UL-SCH 408 in the uplink direction and maps the MTC logical channels to the DL-SCH 512 in the downlink direction, wherein the UL-SCH 408 and the DL-SCH 512 are the transport channels (Step 604). It is to be understood that the execution of the MTC application requires no human interactions, while the execution of the normal UE applications requires human interactions (Step 606). For example, the execution of the electric meter read (an MTC application) may not require human interactions, while the execution of the circuit-switched call (an UE application) would require human interactions.

The MTCTCH 416 may comprise a lower priority than the DTCH 414, and the MTCCCH 418 may comprise a lower priority than the CCCH 410 and/or the DCCH 412 (Step 408 and Step 410). As described previously, when all the traffic data and control data are transmitted by using the DTCH 414, the CCCH 410 and the DCCH 412, the MTC application may share the same QoS level with other normal UE applications, thus it is difficult for the MAC scheduler to identify whether the traffic data and control data carried in the DTCH 414, the CCCH 410 and the DCCH 412 are related to an MTC application. According to an embodiment of the invention, after the traffic data and control data dedicated for the MTC application are carried on the MTCTCH 416 and the MTCCCH 418 respectively, the MAC scheduler may be able to identify the MTCTCH 416, which may comprise a lower priority than the DTCH 414, and the MTCCCH 418, which may comprise a lower priority than the CCCH 410 and/or the DCCH 412.

Figure 7:
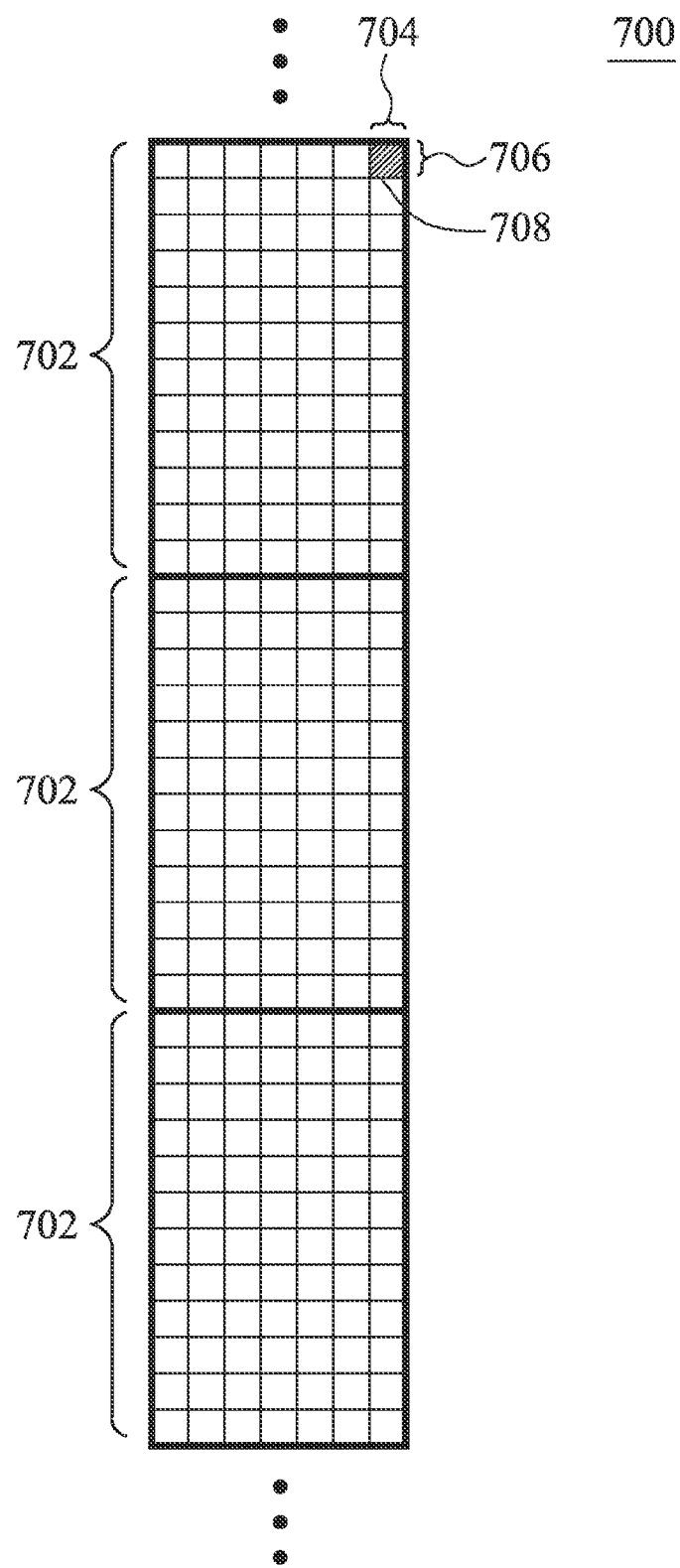
FIG. 7 is a diagram illustrating a physical resource 700 of the LTE technology.

Subsequently, in Step 612, the physical resources are allocated to the MTCTCH 416 and/or the MTCCCH 418 by using an allocation signal and an allocation method, wherein the allocation method of the physical resources may be informed by using the allocation signal. For example, for the LTE technology, it is possible to allocate the physical resources in the time domain and the frequency domain. Reference is made to FIG. 7, which is a diagram illustrating a physical resource 700 of the LTE technology. The physical resource 700 includes multiple Physical Resource Blocks (PRB) 702, wherein each PRB 702 comprises 7 continuous Orthogonal Frequency Division Multiplexing (OFDM) symbols 704 in the time domain (0.5 ms for one PRB 702), and 12 continuous 15 kHz sub-carriers 706 in the frequency domain. The physical resource of one OFDM symbol 704 by one sub-carrier 706 is referred to as a resource element 708. The Physical resources allocated in Step 612 may be the PRB 702 or the resource element 708 as illustrated in FIG. 7.

Refer to FIG. 6, wherein in Step 614, the allocation method may comprise allocating the physical resource by using a dynamic allocation method. Specifically, the physical resource may be allocated dynamically to the MTC device by using a request-response method. For example, the MTC device 102 of a home monitoring device may request for allocation of the physical resource via the RACH 406 when smoke is detected. The network (e.g. the communication network 108) may allocate the physical resources to the home monitoring device upon receiving the request. After the physical resource is allocated dynamically to the MTC device 102, the home monitoring device may transmit related traffic data to the M2M application server 110 (e.g. a home monitoring server) through the MTCTCH 416 and the MTCCCH 418. In another embodiment, the allocation method may comprise allocating the physical resource by using a pre-defined pattern allocation method (Step 616). In the pre-defined pattern allocation method, a pre-defined amount of physical resources may be allocated to the MTC device at a pre-defined time, such that the MTC device 102 and the Node B 204 may transmit the traffic data and the control data dedicated to the MTC application. For example: a pre-defined amount of physical resources (e.g. 5 ms) may be allocated by 0:00 at the end of each month, such that the MTC device 102 (e.g. a smart meter) may establish an RRC connection by using the MTCCCH 418 or the CCCH 410 to the M2M application server 110 (e.g. an electric meter reading application server in a utilities company), and transmit related traffic data (e.g. the electric meter read data) through the MTCTCH 416 after the RRC connection is established. In the above embodiment, the network to which the Node B 204 belongs to may be required to page the smart meter by sending paging messages before an RRC connection is established.

As described previously, the allocation method of the physical resources may be informed by using the allocation signal. In an embodiment, the allocation signal may be acquired from a system information broadcast signal (Step 618), wherein the allocation signal may be a new field in an existing system information broadcast signal or a new system information broadcast signal. In the RRC idle mode, the MTC device 102 may monitor the BCH 510 from the Node B 204, wherein the system information broadcast signal is broadcasted in the BCH 510. In the RRC connected mode, the MTC device 102 may acquire updates of the system information broadcast signals from the DL-SCH 512. In another embodiment, the allocation signal may be acquired from a Radio Resource Control Establishment message (RRC establishment message) received when the MTC device 102 accesses the network (Step 618). For example, an RRC establishment message from the network may be received by the MTC device 102 when the MTC device 102 accesses the network, wherein the RRC establishment message may comprise a radioResourceConfigDedicated information element which indicates the RRC configuration procedure. The allocation signal may be a new field in the radioResourceConfigDedicated information element or a new RRC signal, wherein the MTC device 102 may be informed of the allocation method of the physical resources from the allocation signal.

Figure 8:
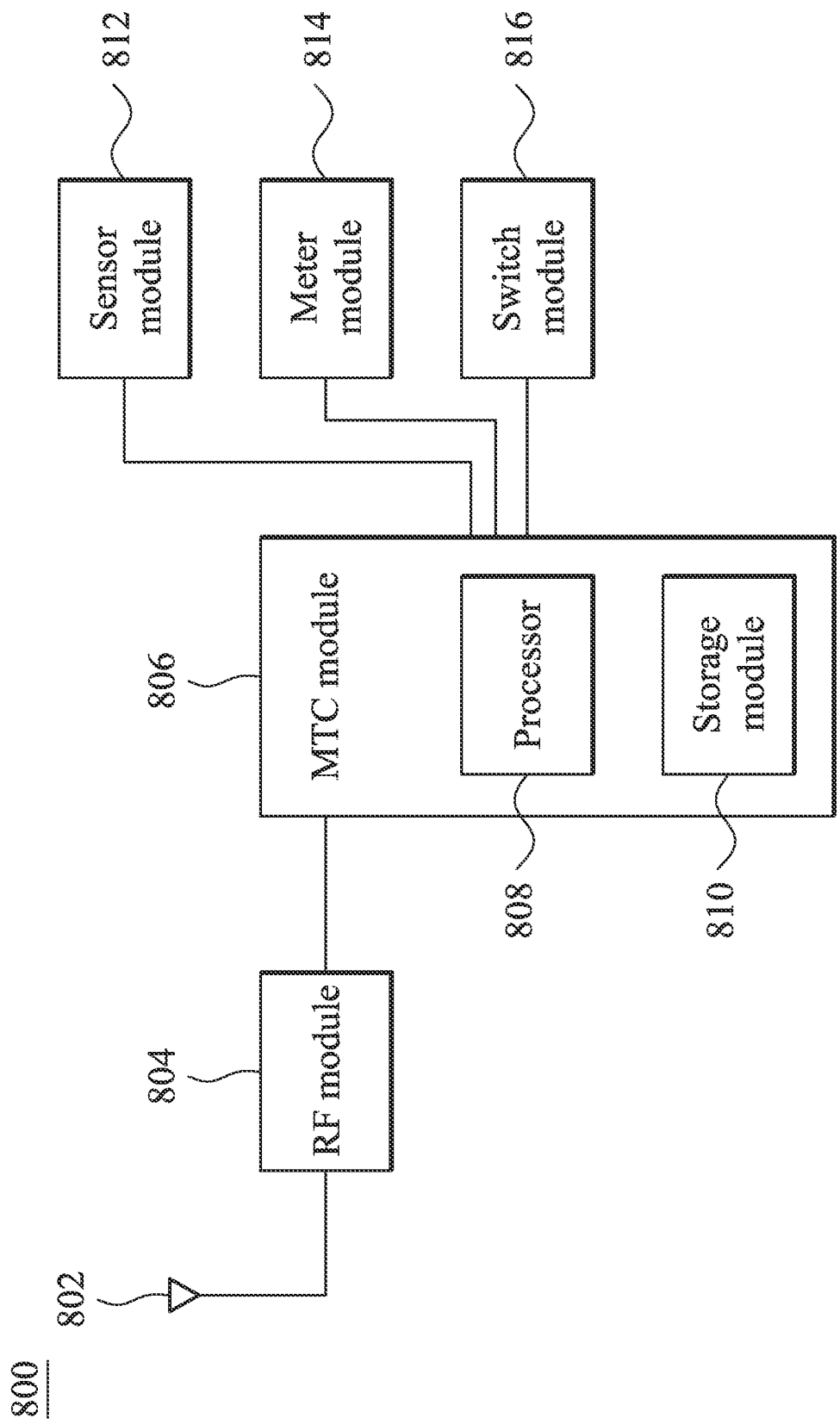
FIG. 8 is a diagram illustrating an exemplary hardware structure that may be employed to realize the MTC logical channel configuration method as described in FIG. 6.

FIG. 8 is a diagram illustrating an exemplary hardware structure that may be employed to realize the MTC logical channel configuration method as described in FIG. 6. FIG. 8 illustrates an apparatus 800 which may be embodied at or as the MTC device 102 as shown in FIG. 1 (e.g. a smart meter). In this regard, note that only elements related to the MTC logical channels configuration are shown here for convenience, with elements not shown, assumed to be known by those skilled in the art. Thus, detailed descriptions are not provided. The UE 800 may include an antenna 802, and a Radio Frequency (RF) module 804 coupled to the antenna 802, wherein the RF module 804 may transform the received wireless RF signals to baseband signals that may be processed by the MTC module 806. The RF module 804 may also transform the baseband signals from the MTC module 806 to the RF signals, which may be transmitted by the antenna 802. The MTC module 806 comprises a processor 808, wherein the processor 808 may be embodied in a number of different ways. For example, the processor 808 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 808 may be configured to execute instructions stored in the memory or otherwise accessible to the processor 808. By executing stored instructions or hard coded instructions, the processor 808 may control the apparatus 800 by directing functionality of the apparatus 800 associated with the configuration of the MTC logical channels described above according to the respective configuration provided to the apparatus 800 by the processor 808 and/or the instructions stored in memory for configuring the processor 808. As such, whether configured by hardware or software methods, or by a combination thereof, the processor 808 may represent an entity capable of performing operations according to exemplary embodiments while configured accordingly.

The apparatus 800 may also include a storage module 810. The storage module 810 may include, for example, volatile and/or non-volatile memory. The storage module 810 may be configured to store information, instructions and/or the like. For example, the storage module 810 could be configured to buffer data for processing by the processor 808 or prior to transmission or successive to reception. Additionally or alternatively, the storage module 810 could be configured to store instructions for execution by the processor 808. The storage module 810 may be an integrated part of the apparatus 800 or may be a removable memory device.

In an exemplary embodiment, the apparatus 800 may further include a sensor module 812, a meter module 814 and/or a switch module 816. The sensor module 812, the meter module 814 and/or the switch module 816 include the hardware which allows the apparatus 800 to read measurements to the MTC data. In some embodiments, the sensor module 812, the meter module 814 and/or the switch module 816 may also include the software for configuring the hardware, for enabling the apparatus 800 to interface and perform the measurement functionalities therewith. Thus, for example, when the apparatus 800 is implemented at or as a home monitoring device, the apparatus 800 may include a sensor module 812, providing functions such as smoke detection, door/windows detection, movements and so on.

In an exemplary embodiment, the MTC device 806 may comprise portions of processing circuitry configured to cause the apparatus 800 to perform functionality according to the configuration either hardwired into the processor 808 or provided by the execution of instructions stored in the storage module 810. As such, the apparatus 800 may be configured to perform configuration of the MTC logical channels as described above according to the perspective of the MTC device 102 in which the apparatus 800 is employed. As such, when employed in the MTC device 102, the apparatus 800 may be configured to configure the MTC logical channels independently from the CCCH, the DCCH, and the DTCH in the MAC layer, wherein the MTC logical channels include the MTCTCH and the MTCCCH, and carry the uplink and downlink traffic data/control data dedicated for the MTC application executed by the MTC device in the MTCTCH/MTCCCH.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Machine Type Communication (MTC) method for an MTC device to configure a plurality of MTC logical channels associated with an MTC application, comprising:

configuring, in a Medium Access Control (MAC) layer, the MTC logical channels independently from a Common Control Channel (CCCH), a Dedicated Control Channel (DCCH), and a Dedicated Traffic Channel (DTCH), wherein the MTC logical channels include a Machine Type Communication Traffic Channel (MTCTCH) and a Machine Type Communication Control Channel (MTCCCH);

carrying uplink and downlink traffic data dedicated for the MTC application executed by the MTC device in the MTCTCH; and carrying uplink and downlink control data dedicated for the MTC application executed by the MTC device in the MTCCCH;

wherein the MTCCCH comprises a lower priority than the CCCH and the DCCH.

2. The MTC method of claim 1, further comprising:
mapping the MTC logical channels to an Uplink Shared Channel (UL-SCH) in an uplink direction; and
mapping the MTC logical channels to a Downlink Shared Channel (DL-SCH) in a downlink direction, wherein the UL-SCH and the DL-SCH are a plurality of transport channels.

3. The MTC method of claim 1, wherein execution of the MTC application requires no human interaction.

4. The MTC method of claim 1, wherein the MTCTCH comprises a lower priority than the DTCH.

5. The MTC method of claim 1, further comprising:
allocating a physical resource to the MTCTCH or the MTCCCH by using an allocation signal and an allocation method.

6. The MTC method of claim 5, wherein the allocation method comprises allocating the physical resource by using a dynamic allocation method.

7. The MTC method of claim 5 the allocation method comprises allocating the physical resource by using a pre-defined pattern allocation method.

8. The MTC method of claim 5, further comprising:
acquiring the allocation signal from a system information broadcast signal.

9. The MTC method of claim 5, further comprising:
acquiring the allocation signal from a Radio Resource Control (RRC) establishment message received when the MTC device accesses a network.

10. A Machine Type Communication (MTC) apparatus for configuring a plurality of MTC logical channels associated with an MTC application, comprising:
a processor configuring the MTC logical channels independently from a Common Control Channel (CCCH), a Dedicated Control Channel (DCCH), and a Dedicated Traffic Channel (DTCH) in a Medium Access Control (MAC) layer, wherein the MTC logical channels comprise a Machine Type Communication Traffic Channel (MTCTCH) and a Machine Type Communication Control Channel (MTCCCH), uplink and downlink traffic data dedicated for the MTC application is carried in the MTCCCH, and uplink and downlink control data dedicated for the MTC application is carried in the MTC-CCH;
wherein the MTCCCH comprises a lower priority than the CCCH and the DCCH.

11. The MTC apparatus of claim 10, wherein the processor maps the MTC logical channels to an Uplink Shared Channel (UL-SCH) in an uplink direction, and maps the MTC logical channels to a Downlink Shared Channel (DL-SCH) in a downlink direction, wherein the UL-SCH and the DL-SCH are a plurality of transport channels.

12. The MTC apparatus of claim 10, wherein execution of the MTC application requires no human interaction.

13. The MTC apparatus of claim 10, wherein the MTCTCH comprises a lower priority than the DTCH.

14. The MTC apparatus of claim 10, wherein the processor further allocates a physical resource to the MTCTCH or the MTCCCH by using an allocation signal and an allocation method.

15. The MTC apparatus of claim 14, wherein the allocation method comprises allocating the physical resource by using a dynamic allocation method.

16. The MTC apparatus of claim 14, wherein the allocation method comprises allocating the physical resource by using a pre-defined pattern allocation method.

17. The MTC apparatus of claim 14, wherein the processor further acquires the allocation signal from a system information broadcast signal.

18. The MTC apparatus of claim 14, wherein the processor further acquires the allocation signal from a Radio Resource Control (RRC) establishment message received when the processor accesses a network.

* * * * *